(12) United States Patent
Currie et al.

(10) Patent No.: US 8,449,283 B2
(45) Date of Patent: May 28, 2013

(54) DIES FOR FORMING EXTRUSIONS WITH THICK AND THIN WALLS

(75) Inventors: Stephen Charles Currie, Corning, NY (US); Mircea Despa, Horseheads, NY (US); Paul Martin Elliott, Corning, NY (US); Richard Curwood Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 702 days.

(21) Appl. No.: 12/483,574

(22) Filed: Jun. 12, 2009

(65) Prior Publication Data

US 2010/0316856 A1    Dec. 16, 2010

(51) Int. Cl.
    *B29C 47/20*    (2006.01)
(52) U.S. Cl.
    USPC ...... 425/197; 264/177.12; 425/199; 425/380; 425/382.4; 425/467
(58) Field of Classification Search
    USPC .............. 425/197, 199, 380, 382.4, 461, 467; 264/177.12
    See application file for complete search history.

(56) References Cited

U.S. PATENT DOCUMENTS

| | | | |
|---|---|---|---|
| 4,118,456 A * | 10/1978 | Blanding et al. | 264/177.12 |
| 4,381,912 A * | 5/1983 | Yamamoto et al. | 425/461 |
| 4,384,841 A * | 5/1983 | Yamamoto et al. | 425/461 |
| 4,468,366 A | 8/1984 | Socha, Jr. | 264/177 R |
| 4,550,005 A * | 10/1985 | Kato | 264/177.12 |
| 4,802,840 A * | 2/1989 | Fukuda et al. | 425/464 |
| 5,238,386 A * | 8/1993 | Cunningham et al. | 425/192 R |
| 5,314,650 A | 5/1994 | Adler et al. | |
| 5,552,102 A | 9/1996 | Kragle et al. | 264/177.11 |
| 2002/0106418 A1 | 8/2002 | Fukushima et al. | |
| 2007/0026188 A1 | 2/2007 | Bookbinder et al. | |
| 2008/0124423 A1 | 5/2008 | Peterson et al. | 425/467 |

FOREIGN PATENT DOCUMENTS

| | | |
|---|---|---|
| EP | 1245359 | 10/2002 |
| JP | 2102004 | 4/1990 |
| WO | WO03/078339 | 9/2003 |

* cited by examiner

*Primary Examiner* — Yogendra Gupta
*Assistant Examiner* — Joseph Leyson
(74) *Attorney, Agent, or Firm* — Robert L. Carlson; Matthew B. McNutt

(57) ABSTRACT

A die for forming an extrusion includes a die body, a body feed section and an extrusion forming section. The die body may include an inlet and an outlet defining an extrudate flow path through the die body. The body feed section may be positioned between the inlet and outlet and includes an arrangement of body feed channels. The extrusion forming section may be positioned between the body feed section and the outlet and includes a thin-wall forming portion fluidly coupled to at least one thick-wall forming portion. The thin-wall forming portion may include an array of pins extending from the body feed section towards the outlet and the thick-wall forming portion may include at least one baffle section positioned in the extrudate flow path through the thick-wall forming portion. The area of the thick-wall forming portion may be greater than an interstitial area between the pins.

19 Claims, 12 Drawing Sheets

DIES FOR FORMING EXTRUSIONS WITH THICK AND THIN WALLS

FIELD

The present invention relates generally to dies for forming extrusions and, more specifically, to dies for forming extrusions with thick-walled and thin-walled portions.

TECHNICAL BACKGROUND

Glass, polymer or ceramic articles with complex cross-sectional structures may be used in a variety of applications. For example, glass or polymer microstructured optical fiber may be drawn from a microstructured optical fiber preform which may generally comprise a central microstructured region surrounded by a cladding or relatively thick-walled solid sleeve. The microstructured region may surround a central core which provides the light guiding characteristics of fiber drawn from the preform. The microstructured region may be formed with a plurality of passages or air holes such that the microstructured region has a very high open to solid ratio (e.g., the microstructured optical fiber is "air filled"). The microstructured region of the preform may be connected to the thick-walled sleeve and the core with a web of thin-walled struts which suspend the microstructured region between the core and the solid sleeve. Accordingly, a radial cross section of the microstructured optical fiber may comprise both thick- and thin-walled portions.

Microstructured optical fiber preforms such as those described above may be formed using various techniques such as, for example, a stack and draw technique where a bundle of capillaries are assembled around a glass core and inserted in a glass sleeve which is drawn into the preform. However, it may be desirable to develop alternative methods for forming microstructured optical fiber preforms and other glass, polymer, or ceramic structures.

SUMMARY

In one embodiment, a die for forming an extrusion includes a die body, a body feed section and an extrusion forming section. The die body may include an inlet and an outlet defining an extrudate flow path through the die body. The body feed section may be positioned between the inlet and outlet and includes an arrangement of body feed channels disposed in the extrudate flow path. The extrusion forming section may be positioned between the body feed section and the outlet and includes a thin-wall forming portion fluidly coupled to at least one thick-wall forming portion. The thin-wall forming portion may include an array of pins extending from the body feed section towards the outlet and the thick-wall forming portion may include at least one baffle section positioned in the extrudate flow path through the thick-wall forming portion. The thick-wall forming portion may have a radial cross sectional area greater than an interstitial area between mutually adjacent pins.

In another embodiment, a method for fabricating a monolithic die for forming an extrusion having a thin-walled portion and a thick-walled portion may include depositing an initial layer of base material and consolidating the initial layer of base material by traversing an output of a radiation source over the initial layer of base material in a predetermined pattern to form an initial cross sectional slice of the die. Thereafter, at least one additional cross sectional slice of the die may be formed on the initial cross sectional slice of the die by a) depositing a layer of base material over a previously consolidated cross sectional slice of the die and b) consolidating the layer of base material to the previously consolidated cross sectional slice of the die by traversing an output of a radiation source over the layer of sinterable powder in a predetermined pattern. Steps a) and b) may be repeated to fabricate the monolithic die. The monolithic die formed by this method may include a die body, a body feed section positioned between an inlet and an outlet of the die body and an extrusion forming section positioned between the body feed section and the outlet. The extrusion forming section may include a thin-wall forming portion having a plurality of pins extending from the body feed section to the outlet and at least one baffled thick-wall forming portion. The baffled thick-wall forming portion may have a radial cross sectional area greater than an interstitial area between mutually adjacent pins.

In another embodiment, an extrusion formed with the dies described herein has a radial cross section that includes at least one thick-walled portion integrally formed with at least one thin-walled portion. The thin-walled portion comprises a web of thin struts separating a plurality of open cells. The struts may have a thickness which is less than a radial thickness of the thick-walled portion.

Additional features and advantages of the various embodiments described herein will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of various embodiments are intended to provide an overview or framework for understanding the nature and character of what is claimed. The accompanying drawings are included to provide a further understanding of the embodiments, and are incorporated into and constitute a part of this specification. The drawings illustrate the various embodiments described and, together with the description, serve to explain the principles and operations of the embodiments.

DETAILED DESCRIPTION OF THE PREFERRED EMBODIMENTS

Figure 2:
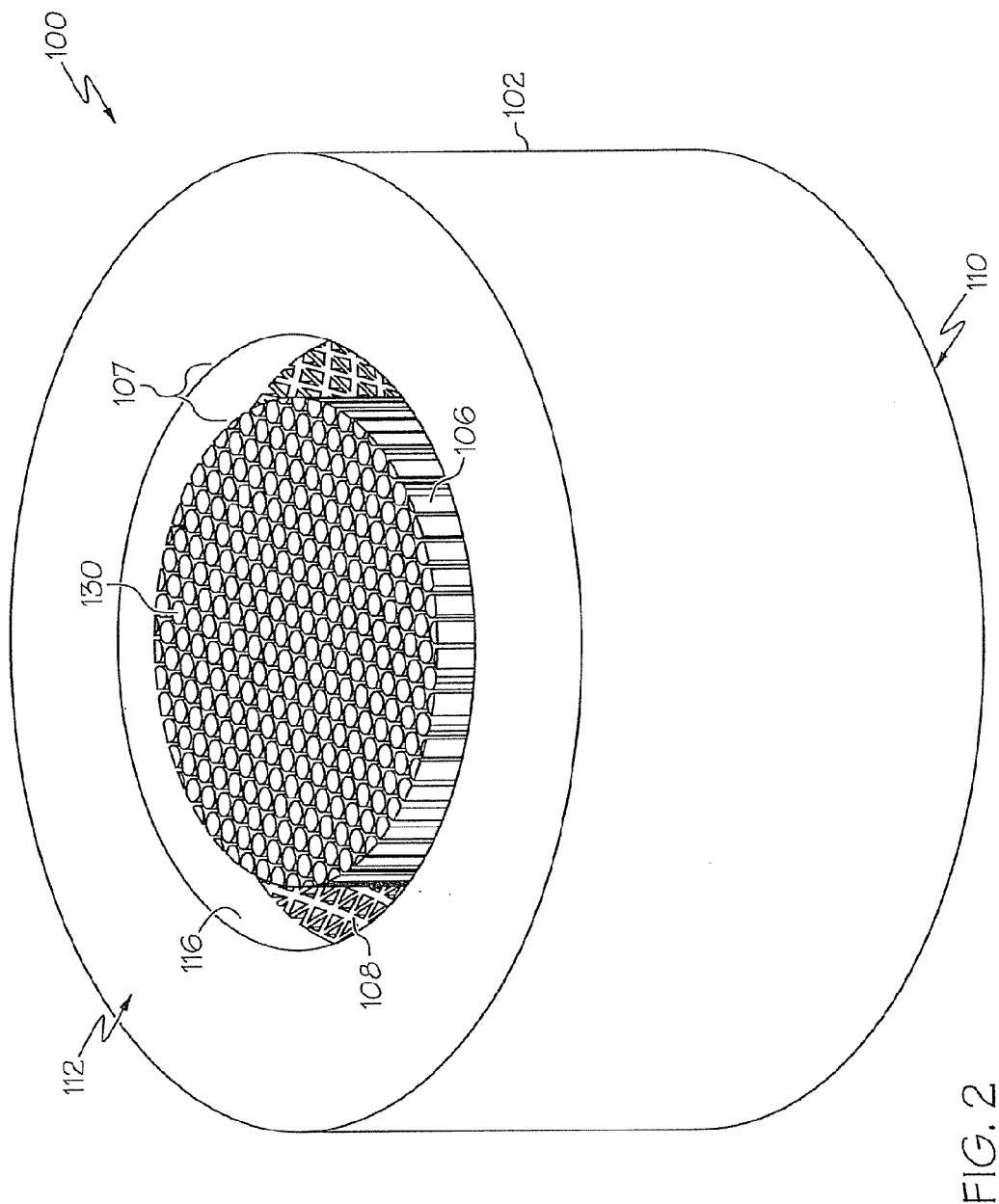
FIG. 2 depicts an outlet side of a die according to one or more embodiments shown and described herein.

Reference will now be made in detail to various embodiments of dies for forming extrusions with thick-walled and thin-walled portions, examples of which are illustrated in the accompanying drawings. Whenever possible, the same reference numerals will be used throughout the drawings to refer to the same or like parts. One embodiment of a die for forming extrusions with thick-walled and thin-walled portions is shown in FIG. 2, and is designated generally throughout by the reference numeral 100. The die may generally comprise a die body comprising an inlet and outlet defining an extrudate flow path. The die body may be formed with an extrusion forming section comprising a thin-wall forming portion having a plurality of pins and a thick-wall forming portion having one or more baffle sections. Each section of the die as well as techniques for forming and using the die will be described in further detail herein.

Figure 1:
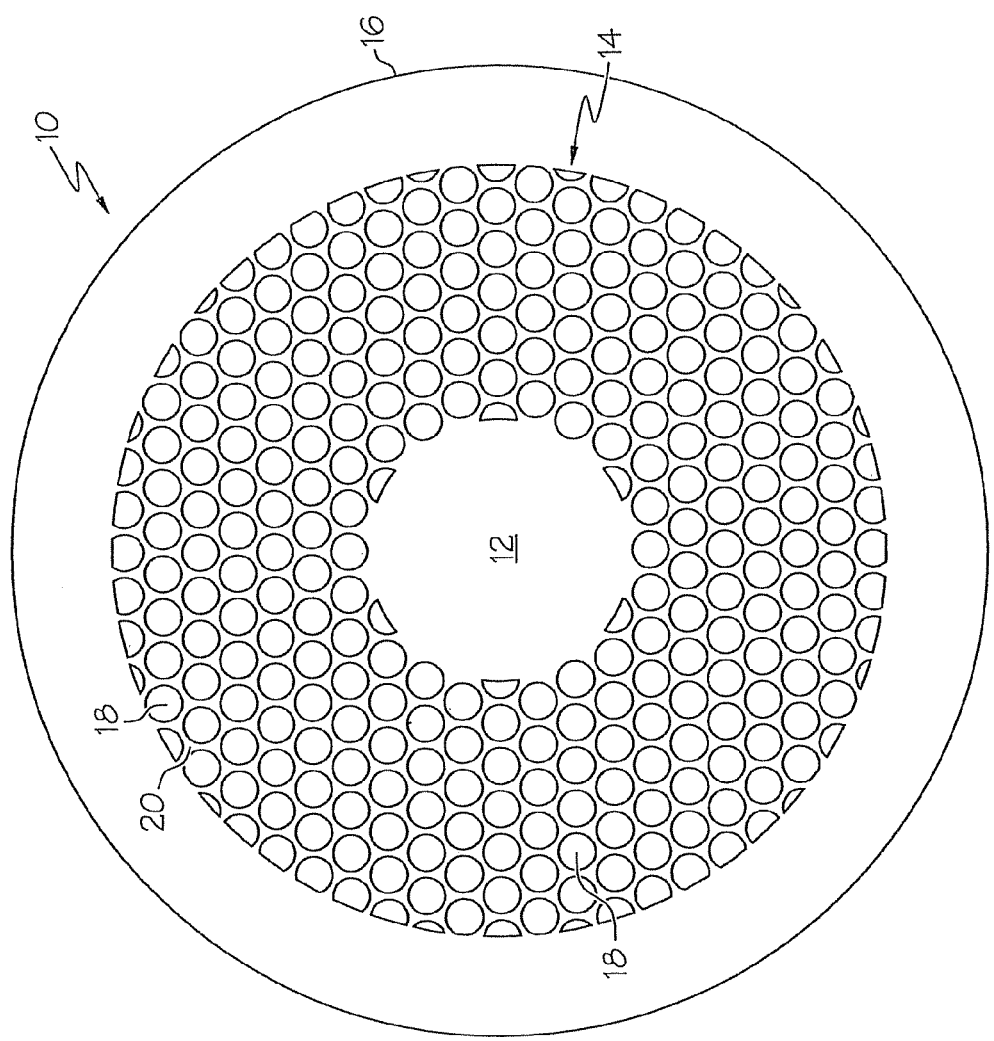
FIG. 1 is a cross section of an extrusion comprising a thick-walled portion and a thin-walled portion formed by an extrusion die according to one or more embodiments shown and described herein.

Referring to FIG. 1, one embodiment of an extrusion 10 comprising thick-walled and thin-walled portions is illustrated in cross-section. The extrusion 10 may be formed by extruding ceramic, glass melt, polymer melt or similar extrudable materials through a die having an extrusion forming section comprising a thick-wall forming portion and a thin-wall forming portion, as described herein. In the illustrated example, the extrusion 10 is a microstructured optical fiber preform produced by extruding a polymeric or glass melt through a baffled die, as will be described further herein. The extrusion 10 generally comprises at least one thick-walled portion, such as solid core 12 or solid sleeve 16, and at least one thin-walled portion, such as the microstructured region 14. Thick-walled and thin-walled, as used herein, refer to the relative thickness of various portions of the extrusion 10.

In the embodiment shown in FIG. 1 the extrusion 10 comprises a solid core 12 surrounded by a microstructured region 14. A relatively thick-walled solid sleeve 16 surrounds the microstructured region 14. The microstructured region 14 may comprise a plurality of open cells 18 which extend down the long axis of the preform forming channels or air lines. Each cell 18 is separated from adjacent cells by a web of relatively thin-walled struts 20. In the embodiment shown, the web of struts 20 extends between the core 12 and the sleeve 16. In general, the struts 20 have a thickness which is substantially less than the radial thickness of the sleeve 16 and/or the core 12.

While FIG. 1 shows an extrusion 10 having a solid core 12 surrounded by a microstructured region 14 and sleeve 16, it should be understood that various other configurations and orientations of the thin-walled and thick-walled portions of the extrusion 10 may be possible utilizing the baffled dies described herein. For example, the extrusion may have a solid core, a hollow core, multiple cores (e.g., multiple solid cores, multiple hollow cores or combinations thereof) or no core.

Figure 3:
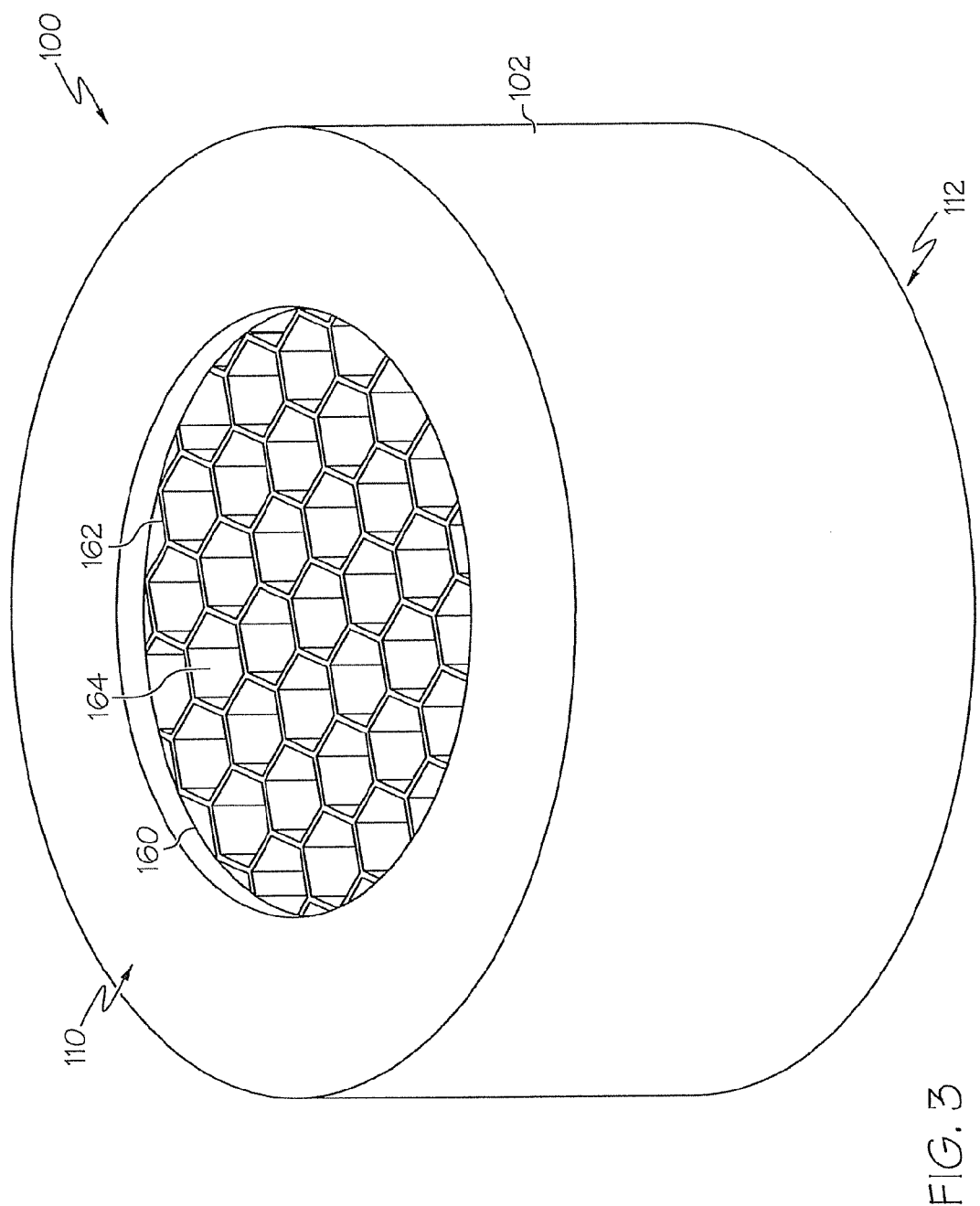
FIG. 3 depicts an inlet side of a die according to one or more embodiments shown and described herein.
Figure 4:
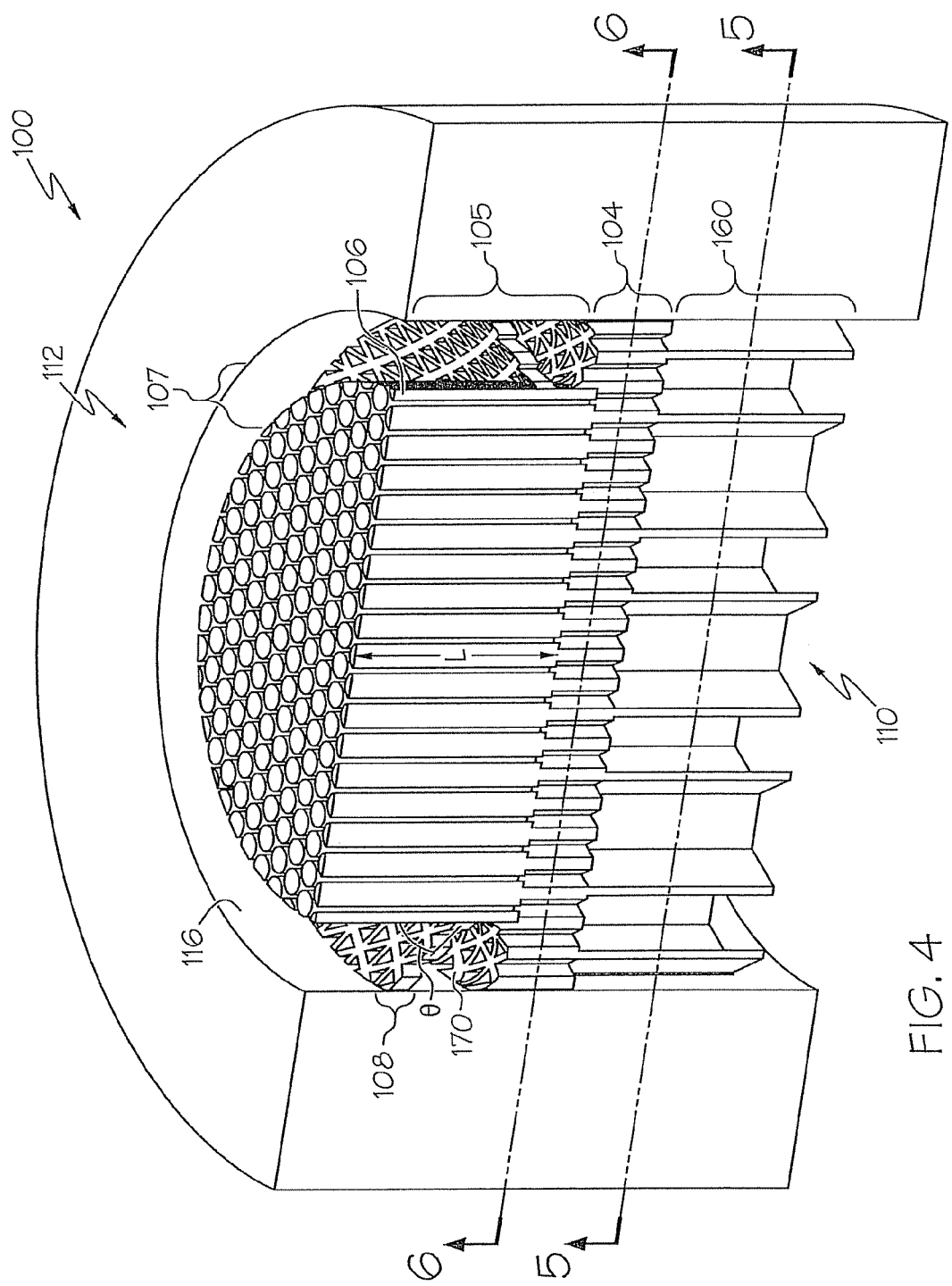
FIG. 4 depicts a cross section of a die according to one or more embodiments shown and described herein.

Referring now to FIGS. 2-4, one embodiment of a die 100 for forming an extrusion with thick-walled and thin-walled portions is depicted. The die 100 generally comprises a die body 102 formed with a body feed section 104 and an extrusion forming section 105. The extrusion forming section 105 comprises a thin-walled forming portion 106 and at least one thick walled forming portion 107 comprising at least one baffle section 108. In the embodiments shown herein, the die 100 may also comprise an inlet feed section 160 and a body feed section 104. However, it will be understood that the die 100 may be formed with or without the inlet feed section 160 and body feed section 104.

The die body 102 may comprise a substantially cylindrical tube having an interior sidewall 116, an inlet 110 and an outlet 112. The internal diameter of the die body 102 may be from about 2 mm to about 200 mm, more preferably from about 10 mm to about 100 mm and, most preferably, from about 20 mm to about 80 mm. The inlet 110 and the outlet 112 are positioned at either end of the die body 102 and generally define an extrudate flow path through the die body 102 such that extrudate entering the inlet 110 under an applied pressure or force is fed through the die body 102 and exits the die body 102 at the outlet 112. Accordingly, it should be understood that the inlet 110 of the die 100 is fluidly coupled to the outlet 112 of the die 100.

While the die body 102 is shown and described herein as being substantially cylindrical, it should be understood that the die body 102 may have various other geometrical configurations. For example, the cross section of the die body 102 and/or the extrudate flow path through the die body 102 may be square, rectangular triangular, etc., depending on the desired shape of the resulting extrusion.

Figure 5:
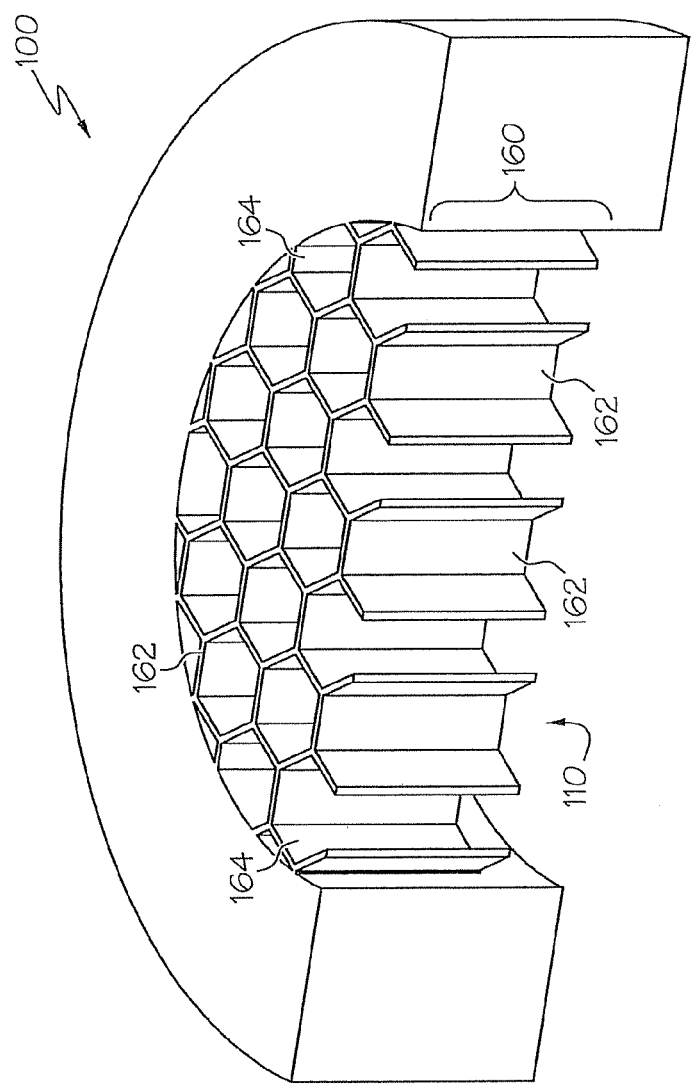
FIG. 5 depicts a partial cross section of the die of FIG. 4 according to one or more embodiments shown and described herein.

Referring now to FIGS. 3-5, when the die 100 comprises an inlet feed section 160, the inlet feed section 160 may be positioned in the die body such that, when an extrudate enters the inlet 110, the extrudate initially flows through the inlet feed section 160. Accordingly, it should be understood that the inlet feed section 160 is fluidly coupled to the inlet 110 of the die body 102. The inlet feed section 160 may comprise an arrangement of inlet feed channels 164 which are disposed in the extrudate flow path through the die body 102. The inlet feed channels 164 are formed by a plurality of inlet feed ribs 162 which extend across the die body 102. In the embodiment shown in FIGS. 3-5, the inlet feed ribs 162 are arranged in an intersecting pattern such that the inlet feed channels 164 are hexagonal in cross section. However, it should be understood that, in other embodiments (not shown), the inlet feed ribs 162 may have various other arrangements such that the inlet feed channels 164 have different cross sectional shapes. For example, the inlet feed channels 164 may have a cross section which is circular, triangular, square, rectangular, octagonal or the like.

While the embodiments of the die 100 shown and described herein comprise an inlet feed section 160, it should be understood that the inlet feed section 160 is optional and that the die 100 may be formed without an inlet feed section 160 without affecting the functionality of the die 100.

Figure 6:
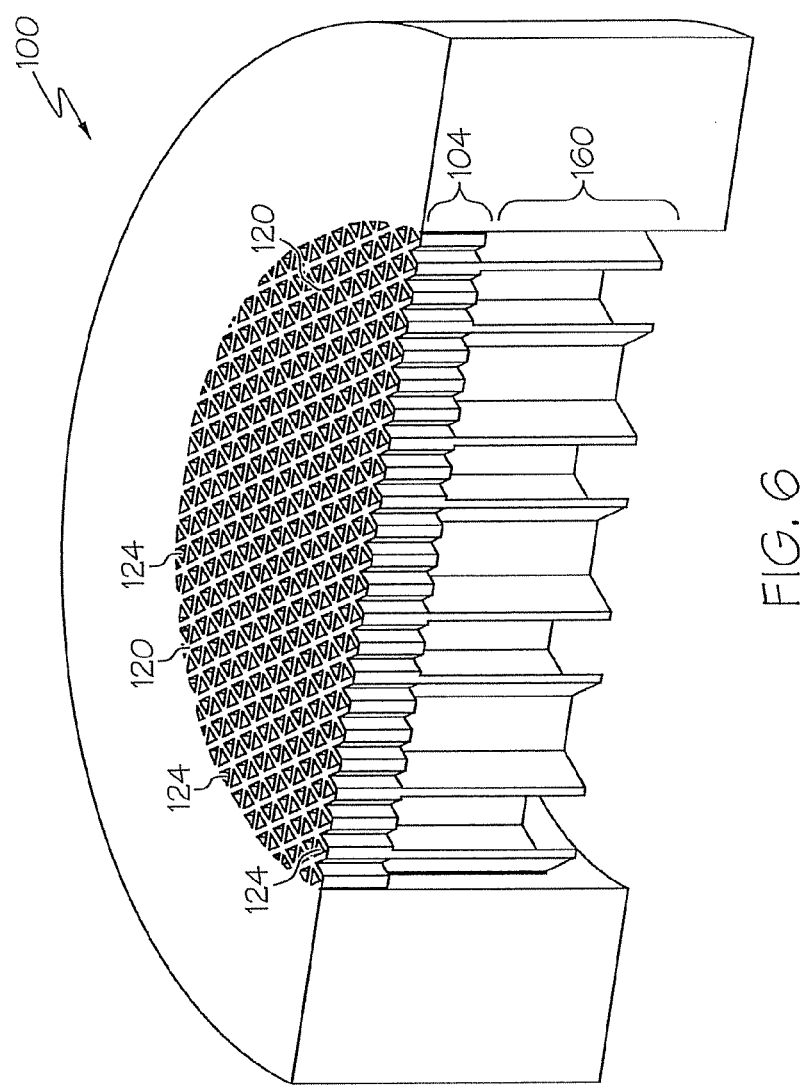
FIG. 6 depicts a partial cross section of the die of FIG. 4 according to one or more embodiments shown and described herein.

Referring now to FIGS. 4 and 6, the die 100 may comprise a body feed section 104. When the die 100 comprises an inlet feed section 160, as shown in FIG. 4 and described above, the body feed section 104 is positioned in the die body 102 between the extrusion forming section 105 and the inlet feed section 160 such that the body feed section 104 is fluidly coupled to the inlet feed section 160 and, in turn, the inlet 110.

However, in other embodiments (not shown) where the die 100 does not comprise an inlet feed section 160, the body feed section 104 is positioned in the die body 102 between the extrusion forming section 105 and the inlet 110 such that the body feed section 104 is directly fluidly coupled to the inlet 110.

The body feed section 104 may comprise an arrangement of body feed channels 124 which are disposed in the extrudate flow path through the die body 102. The body feed channels 124 are formed by a plurality of body feed ribs 120 which are arranged across the interior of the die body 102. In the embodiment shown in FIG. 6, the body feed ribs 120 are arranged in an intersecting pattern such that the body feed channels 124 are triangular in cross section. However, it should be understood that, in other embodiments (not shown), the body feed ribs 120 may have various other arrangements such that the body feed channels 124 have different cross sectional shapes. For example, the body feed ribs 120 may be arranged such that the body feed channels 124 may have a cross section which is circular, square, rectangular, hexagonal, octagonal, or the like.

When the die 100 comprises both an inlet feed section 160 and a body feed section 104, as shown in the embodiments described herein, the body feed channels 124 are disposed over the inlet feed channels 164 such that the body feed channels 124 are fluidly coupled to the inlet feed channels 164. Further, the cross sectional area of each body feed channel 124 (e.g., the cross sectional area enclosed by the body feed ribs 120 which form each body feed channel) is less than the cross sectional area of each inlet feed channel 164 (e.g., the cross sectional area enclosed by the inlet feed ribs 162).

Referring to FIG. 4, in one embodiment, the outlet side of the body feed section 104 (e.g., the side of the body feed section 104 closest to the outlet 112) is formed with a U-shaped or concave annular portion 170 such that the body feed section 104 has a tapered transition into the interior sidewall 116 of the die body 102 and the thin-wall forming portion 106. The concave annular portion 170 extends around the outlet side of the body feed section 104 between the microstructured forming section and the interior sidewall 116 of the die body. Further, while the body feed section 104 is shown and described as being formed with a concave annular portion 170, it should be understood that the annular portion may have different cross sectional areas. For example, the annular portion may be V-shaped or wedge shaped (e.g., the body feed section 104 may taper inwardly from the interior sidewall 116 of the die body 102 to the microstructure forming section). Further, while the embodiments of the die 100 are shown and described herein as comprising a concave annular portion 170, it should be understood that the die 100 may be formed without the concave annular portion 170.

Figure 8:
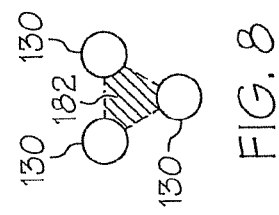
FIG. 8 depicts the spacing between three mutually adjacent pins of the thin-wall forming portion of the die of FIG. 4 according to one or more embodiments shown and described herein.
Figure 7:
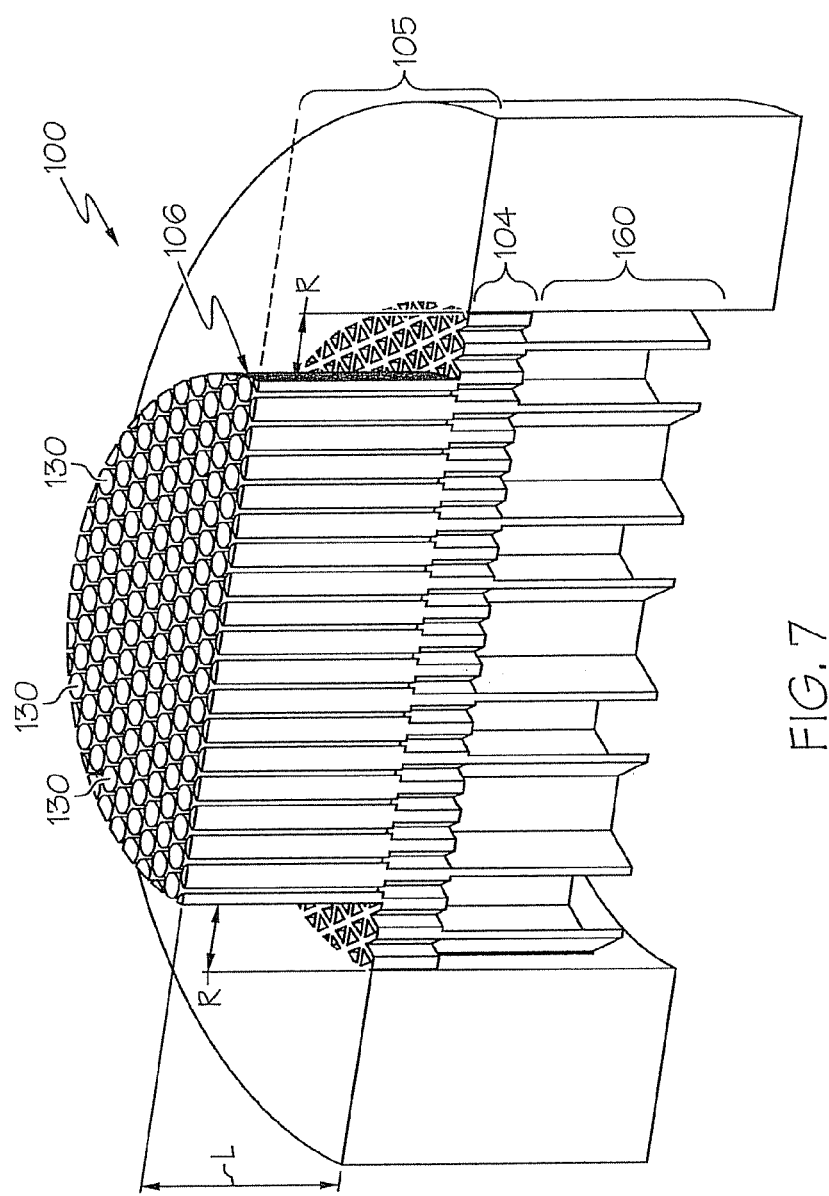
FIG. 7 depicts a partial cross section of the die of FIG. 4 according to one or more embodiments shown and described herein.

Referring now to FIGS. 4 and 7-8, the extrusion forming section 105 of the die 100 is positioned in the die body 102 between the inlet 110 and the outlet 112 of the die 100. When the die 100 comprises a body feed section 104, as depicted herein, the extrusion forming section may be positioned between the body feed section 104 and the outlet 112. The extrusion forming section 105 may generally comprise at least one thick-wall forming portion 107 and at least one thin-wall forming portion 106. The terms "thick-wall" and "thin-wall," as used herein, refer to the relative wall thickness of the portions of the extrusion formed by the thick-wall forming portion 107 and the thin-wall forming portion 106 of the extrusion forming section 105. Accordingly, it will be understood that the thick-wall forming portion 107 forms a portion of an extrusion which has a wall thickness greater than the wall thickness of portions of the extrusion formed by the thin-walled forming portion 106.

Still referring to FIGS. 4 and 7-8, the thin-wall forming portion 106 generally comprises a plurality of pins 130 positioned in the die body 102 and disposed in the extrudate flow path of the die 100. The pins 130 have a length L in the axial direction of the die body 102 and extend from the body feed section 104 in a direction towards the outlet 112 of the die 100. The length L of the pins 130 may be from about 0.1 mm to about 25 mm, preferably from about 1 mm to about 20 mm and, most preferably, from about 5 mm to about 10 mm. The diameter of the pins 130 may be from about 0.08 mm to about 10 mm, preferably from about 0.5 mm to about 3 mm. Where the die 100 comprises a body feed section 104, as described herein, the pins 130 may extend from the body feed ribs 120 of the body feed section 104. In one embodiment, where the body feed ribs 120 are oriented in an intersecting pattern, the pins 130 may extend from intersections of the body feed ribs 120. The pins 130 may be spaced apart from one another and the interstitial areas 182 between the pins 130 are fluidly coupled to one another, to the body feed channels 124, to the outlet 112, and to the thick-wall forming portion 107. The spacing between adjacent pins is from about 0.1 mm to about 5 mm, preferably from about 0.15 mm to about 1 mm.

Because the interstitial areas 182 between the pins 130 are fluidly coupled to one another, extrudate material flowing through the thin-walled forming portion 106 re-knits or reconsolidates around the pins 130 in a radial direction. However, the pins 130 have length L which is sufficient to prevent the extrudate material from re-knitting or reconsolidating in an axial direction as the extrudate material exits the thin-walled forming portion 106. Accordingly, it should be understood that the pins 130 of the thin-walled forming portion 106 impart structure to the extrudate material and, more specifically, form channels in the extrudate material which have a cross-section corresponding to the cross section of the pins 130.

When the die 100 is used to form an extrusion similar to that depicted in FIG. 1, the extrudate material flowing through the interstitial areas 182 forms the microstructured region 14 of the extrusion 10 and the shape of the pins 130 dictates the cross sectional shape of the cells 18 while the relative orientation and arrangement of the pins 130 determines the shape and arrangement of the thin-walled struts 20. In the embodiments shown herein, the pins 130 are circular in cross section. However, it should be understood that the pins 130 may have other cross sectional shapes including, without limitation, square, rectangular, triangular, hexagonal, octagonal, and the like. Furthermore, it should be understood that the extrusion forming section 105 may comprise combinations of pins having different cross-sections.

Further, in the embodiments shown and described herein, the pins 130 are arranged in a pattern of offset rows such that a center point of a pin in one row is located at the midpoint between two consecutive pins in an adjacent row as shown in FIG. 8. However, it should be understood that the pins 130 may be arranged in various other orientations or randomly oriented.

As described hereinabove, the extrusion forming section 105 may also comprise a thick-wall forming portion 107. The thick-wall forming portion 107 generally comprises a channel disposed in the extrudate flow path through the die body. The thick-wall forming portion 107 may be generally coextensive with the thin-wall forming portion 106 and fluidly coupled to the interstitial areas 182 of the thin-wall forming portion 106 as shown in FIGS. 4 and 7. By way of example and not limitation, in the embodiment of the die 100 shown in FIG. 4, the thick-wall forming portion 107 comprises an annular channel which extends around the thin-wall forming portion between the pins 130 and an interior sidewall 116 of the die body 102. However, it will be understood that the thick-wall forming portion may have different configurations and that different relative orientations of the thick-wall forming portion 107 and the thin-wall forming portion 106 may be possible, as will be described in more detail herein.

The thick-wall forming portion 107 generally has a thickness (e.g., a radial thickness R in the embodiment shown in FIG. 7) such that the radial cross sectional area of the thick-wall forming portion 107 is greater than the interstitial area 182 between adjacent pins 130 of the thin-wall forming portion 106. The thick-wall forming portion 107 of the die 100 may have a radial thickness of from about 0.5 mm to about 25 mm, preferably from about 1 mm to about 10 mm and, most preferably from about 2 mm to about 8 mm. The difference between interstitial area 182 and the radial cross sectional area of the thick-wall forming portion 107 may cause extrudate material flowing through the extrudate flow path of the die to have a non-uniform flow rate and corresponding pressure drop across a radial cross section of the extrusion forming section 105 due to differing amounts of drag. Specifically, extrudate material moving through the thick-wall forming portion 107 experiences less drag than extrudate material moving through the thin-wall forming portion 106 which may result in abnormalities in the resulting extrusion. Accordingly, to compensate for this effect, the die 100 comprises one or more baffle sections 108 disposed in the thick-wall forming portion 107. The baffle section 108 impedes the flow of extrudate material through the thick-wall forming portion 107 and thereby equalize the flow rate of extrudate material in the thick-wall forming portion 107 and the thin-wall forming portion 106.

Figure 10:
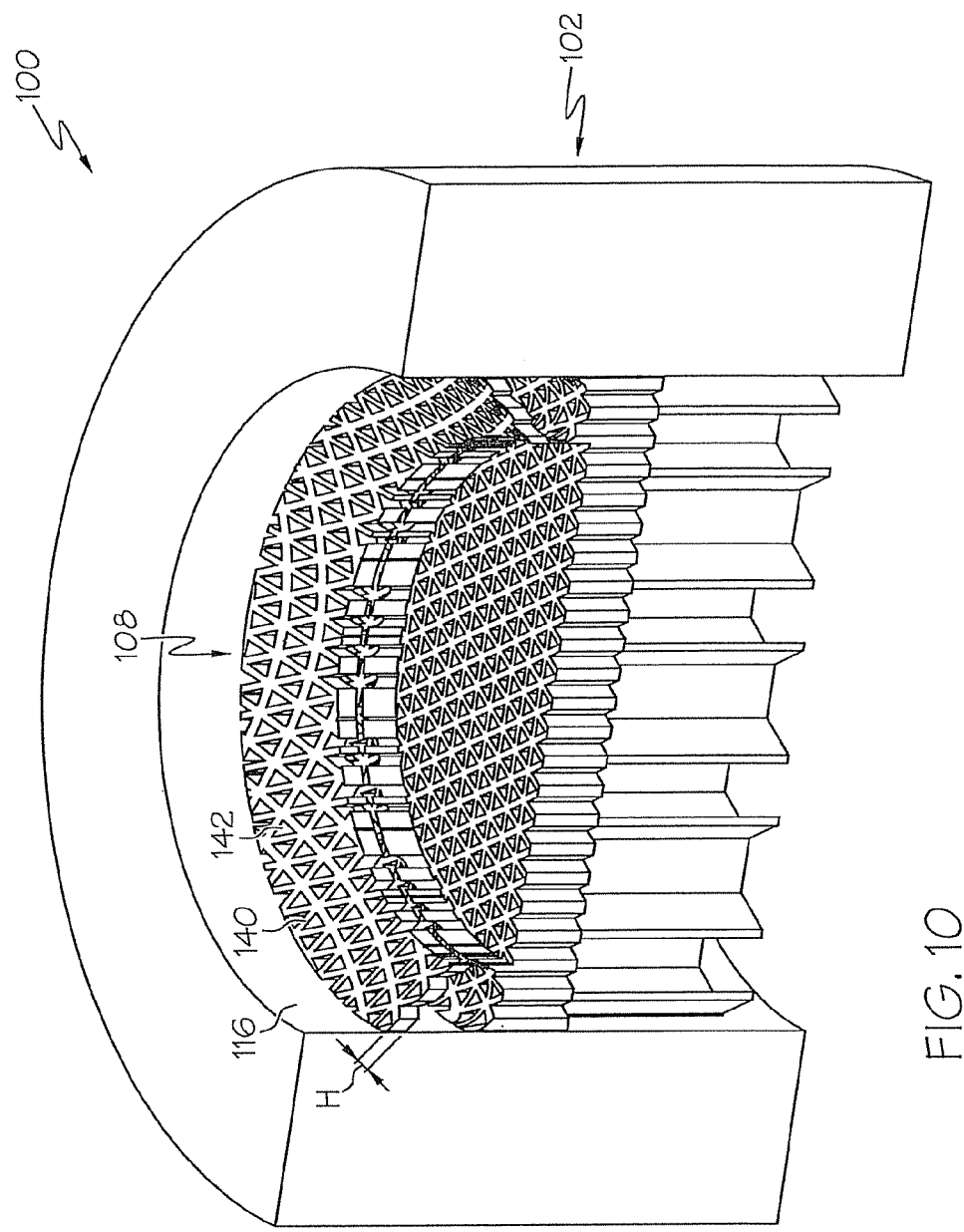
FIG. 10 depicts a partial cross section of the die of FIG. 4 without the thin-wall forming portion for illustrative purposes.

Referring to FIGS. 4 and 10, the at least one baffle section 108 is disposed within the thick-wall forming portion 107. More specifically, in the embodiments shown in FIG. 2, the baffle section 108 is suspended between the thin-wall forming portion 106 and the interior sidewall 116 of the die body 102. FIG. 10 shows a partial cross section of the die body 102 without the thin-wall forming portion so as to better illustrate the baffle section 108. In this embodiment, the baffle section 108 is axially positioned in the die body 102 between the body feed section 104 and the outlet 112 and extends around the thin-wall forming portion 106. The baffle section 108 is spaced apart from both the body feed section 104 and the outlet 112 of the die 100.

In the embodiments shown herein, the baffle section 108 comprises an arrangement of rib-like baffles 140 suspended between the thin-wall forming portion and the interior sidewall 116 of the die body 102. In the embodiments described herein, the height H of the baffles 140 may be from about 0.02 mm to about 10 mm, preferably from about 0.1 mm to about 1 mm and, most preferably, from about 0.4 mm to about 0.5 mm. The thickness of the baffles 140 may be from about 0.02 mm to about 10 mm, preferably from about 0.1 mm to about 1 mm and, most preferably, from about 0.4 mm to about 0.5 mm.

The baffles 140 are arranged to form a plurality of baffle channels 142 which extend through the baffle section 108. As extrudate material flows through the baffle section 108, the baffles 140 impede or slow the flow of the extrudate material and, as a result, equalize the flow rate of material through the thick-wall forming portion 107 and the thin-wall forming portion 106 by dividing the flow of extrudate material around the baffles 140 and through the baffle channels 142. However, the height H of the baffles 140 is significantly less than the length L of the pins 130 of the thin-walled forming section 106 such that, after extrudate material passes around the baffles 140 and through the baffle channels 142, the extrudate material re-knits or reconsolidates in both the axial and radial directions. In the embodiments shown and described herein, the ratio of the length L of the pins 130 to the height H of the baffles 140 may be less than about 1000, more preferably less than about 100 and, most preferably less than about 10. Accordingly, it should be understood that the baffles 140 and baffle channels 142 do not impart structure to the extrudate material flowing through the thick-wall forming portion 107.

In the embodiments of the die 100 shown and described herein the baffle channels 142 are substantially triangular in cross section. However, it should be understood that the baffle channels 142 may have various other cross sections including, without limitation, circular, square, rectangular, hexagonal, octagonal or the like.

In the embodiment shown in FIGS. 4 and 10 the die 100 comprises a single baffle section 108 and the area of each baffle channel 142 in the baffle section 108 is substantially equal to the interstitial area 182 between mutually adjacent pins 130. However, it should be understood that various other configurations of the baffle section 108 may be possible. For example, in another embodiment (not shown) the die 100 may comprise multiple baffle sections disposed in the thick-wall forming portion 107 along the axial length of the die 100 with each baffle section operating to individually and collectively impede the flow of extrudate material in the thick-wall forming portion 107. Each baffle section may comprise a plurality of baffles and baffle channels, as described herein, and the area of each baffle channel may be the same for each consecutive baffle section. In an alternative embodiment, the area of the baffle channels in consecutive baffles sections may be graduated along the axial length of the die 100 such that baffle sections closer to the die inlet comprise smaller baffle channels while baffle sections closer to the outlet have larger baffle channels. In another alternative embodiment, the area of each baffle channel may be graduated along the axial length of the die 100 such that baffle sections closer to the die inlet comprise larger baffle channels while baffle sections closer to the outlet have smaller baffle channels. Accordingly it should be understood that multiple baffle sections with various configurations of baffles 140 and sizes and shapes of baffle channels 142 may be utilized in the die 100 to impede the flow of extrudate material through the thick-walled forming section and thereby equalize the flow rate of extrudate material across a radial cross section of the die in the extrusion forming section 105.

In one embodiment, as shown in FIGS. 4 and 10, the baffle section 108 is oriented at an angle with respect to the thin-wall forming portion 106 and the interior sidewall 116 of the die body 102. With specific reference to the outlet side of the baffle section 108, the angle θ between the thin-wall forming portion 106 and the outlet side of the baffle section 108 is less than about 90 degrees. However, it should be understood that the baffle section 108 may be oriented in the die body 102 such that the angle between the outlet side of the baffle section 108 and the interior sidewall 116 of the die body is less than about 90 degrees or equal to 90 degrees.

In the embodiment of the die 100 shown in FIG. 4 the thick-wall forming portion 107 extends around the thin-wall forming portion 106. Accordingly, material flowing through the thick-wall forming portion 107 forms a thick-walled sleeve around the material flowing through the thin-wall forming portion 106, similar to the thick-walled sleeve 16 surrounding the microstructured region 14 in the extrusion 10 depicted in FIG. 1. However it should be understood that other relative orientations and configurations of the thick-wall forming portion 107 and the thin-wall forming portion 106 may be possible to form extrusions of different configurations.

Figure 9:
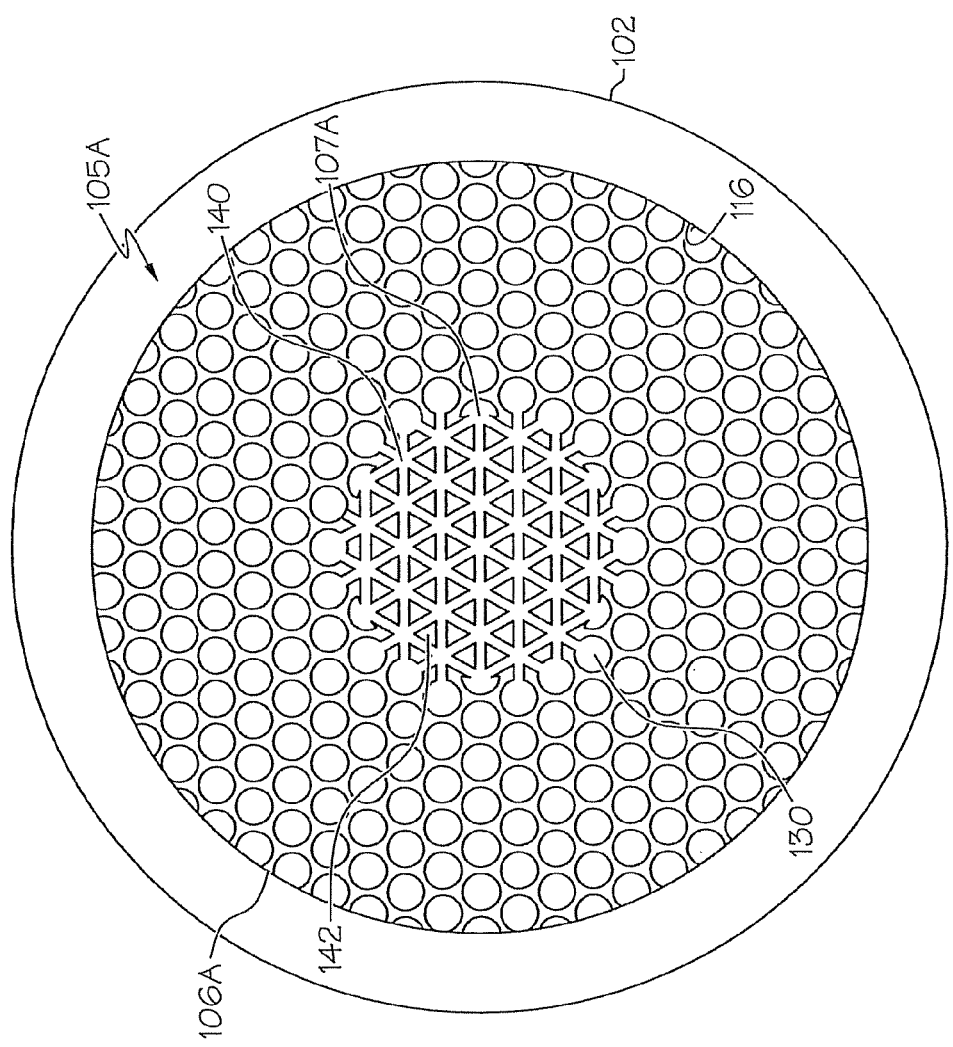
FIG. 9 depicts a cross section of a thin-wall forming portion having a core forming member for forming a solid core in an extrusion according to one embodiment shown and described herein.

Referring to FIG. 9 by way of example, a radial cross section of one alternative embodiment of an extrusion forming section 105A is depicted. In this embodiment the thin-wall forming portion 106A extends radially to the interior sidewall 116 of the die body 102 and forms an annular ring around the thick-wall forming portion 107A. The thin-wall forming portion comprises a plurality of pins 130 as described above. The thick-wall forming portion 107A is generally hexagonal in radial cross section and comprises a baffle section having a plurality of baffles 140 disposed in the extrudate flow path through the thick-wall forming portion 107A. As described herein, the baffles 140 are arranged to form baffle channels 142 which, in the embodiment shown, are triangular in cross section. A die having an extrusion forming section 105A with this configuration may be used to form an extrusion having a thick-walled solid central core formed by the thick-wall forming portion 107A which is surrounded by a web of thin-walled struts and cells formed by the thin-wall forming portion 106A. While the embodiment of the extrusion forming section 105A shown in FIG. 9 is depicted as comprising a thick-wall forming portion 107A for forming a solid core, it should be understood that the thick wall forming portion 107A may be formed with a plurality of channels (not shown) of various cross sectional shapes and configurations for forming an extrusion with multiple solid core elements.

In another embodiment (not shown), the extrusion forming section may comprise multiple thin-wall forming portions and/or multiple thick wall forming portions. For example, the extrusion 10 shown in FIG. 1 and comprising a thick-walled solid sleeve 16, a microstructured region 14 and a solid core 12 may be formed with a die comprising two thick-wall forming portions and one thin-wall forming portion oriented such that a first baffled thick-wall forming portion is surrounded by a thin-wall forming portion which, in turn, is surrounded by a second baffled thick-wall forming portion.

It should be understood that the thin-wall and thick-wall forming portions may be circular, triangular, square, rectangular, hexagonal, octagonal or any other suitable regular or irregular geometrical configuration and/or various combinations thereof For example, a baffled, triangular-shaped thick-wall forming portion may be positioned at the center of a circular thin-wall forming portion.

In one embodiment, the die 100 may be monolithically formed and, as such, each section of the die described hereinabove may be integrally formed with the die body. Accordingly, while the structure of the die 100 has been described herein in discrete parts or sections, it will be understood that the die may be formed as a single, monolithic piece.

For example, the die 100 may be monolithically formed utilizing a layer-by-layer additive process in which consecutive discrete layers of a base material are deposited and consolidated to monolithically form the features of the die. For example, the die may be formed utilizing a process similar to that described in U.S. patent application Ser. No. 11/605,755, filed Nov. 29, 2006 and entitled "EXTRUSION DIE MANUFACTURING METHOD," which is herein incorporated by reference. Specifically, the die may be formed by depositing an initial layer of a base material, such as a sinterable ceramic powder or sinterable metallic powder, on a build platform. The sinterable powder may be deposited on the build platform under an inert atmosphere such as, for example, an argon or nitrogen atmosphere. After the sinterable powder is deposited, a radiation source such as, for example, a laser or an electron beam, is traversed over the deposited power in a predetermined pattern to consolidate the base material (e.g., sinter the base material when the base material is a powdered metal or ceramic) into a solid layer having the desired features. In this embodiment, the thermal energy imparted to the powder by the radiation source sinters the powder to the build platform thereby forming an initial cross sectional slice of the die. Thereafter, additional cross sectional slices of the die may be formed on the initial cross sectional slice by depositing additional layers of the base material over the initial cross sectional slice and traversing the radiation source over each deposited layer of base material in a predetermined pattern thereby consolidating the additional layer of base material and joining the layer to the previously consolidated cross sectional slice. The process may be repeated multiple times to build up the body of the die and any internal features. It will be understood that the pattern over which the radiation source is traversed may be varied to form different features of the die, as will be described in more detail herein.

Referring to FIGS. 2-4 and 11A-11C, in one embodiment, the die 100 may be fabricated from the outlet to the inlet using a layer-by-layer powder deposition and consolidation process. The method comprises depositing an initial layer of a base material 202 on a build platform 200. In this embodiment the base material may be a sinterable material such as a cobalt-chrome alloy metallic powder, or a similar metallic powder. Alternatively, the sinterable material may be a ceramic powder. In the embodiment described herein the sinterable material comprises discrete particles sieved at 80 microns, although it will be understood that particles of other sizes may also be utilized depending on the desired surface finish of the die. The sinterable material may be deposited in a layer which is approximately 20 microns thick, although thicker or thinner layers may be deposited depending on the power of the radiation source used to consolidate the individual layers of powder.

Figure 11A:
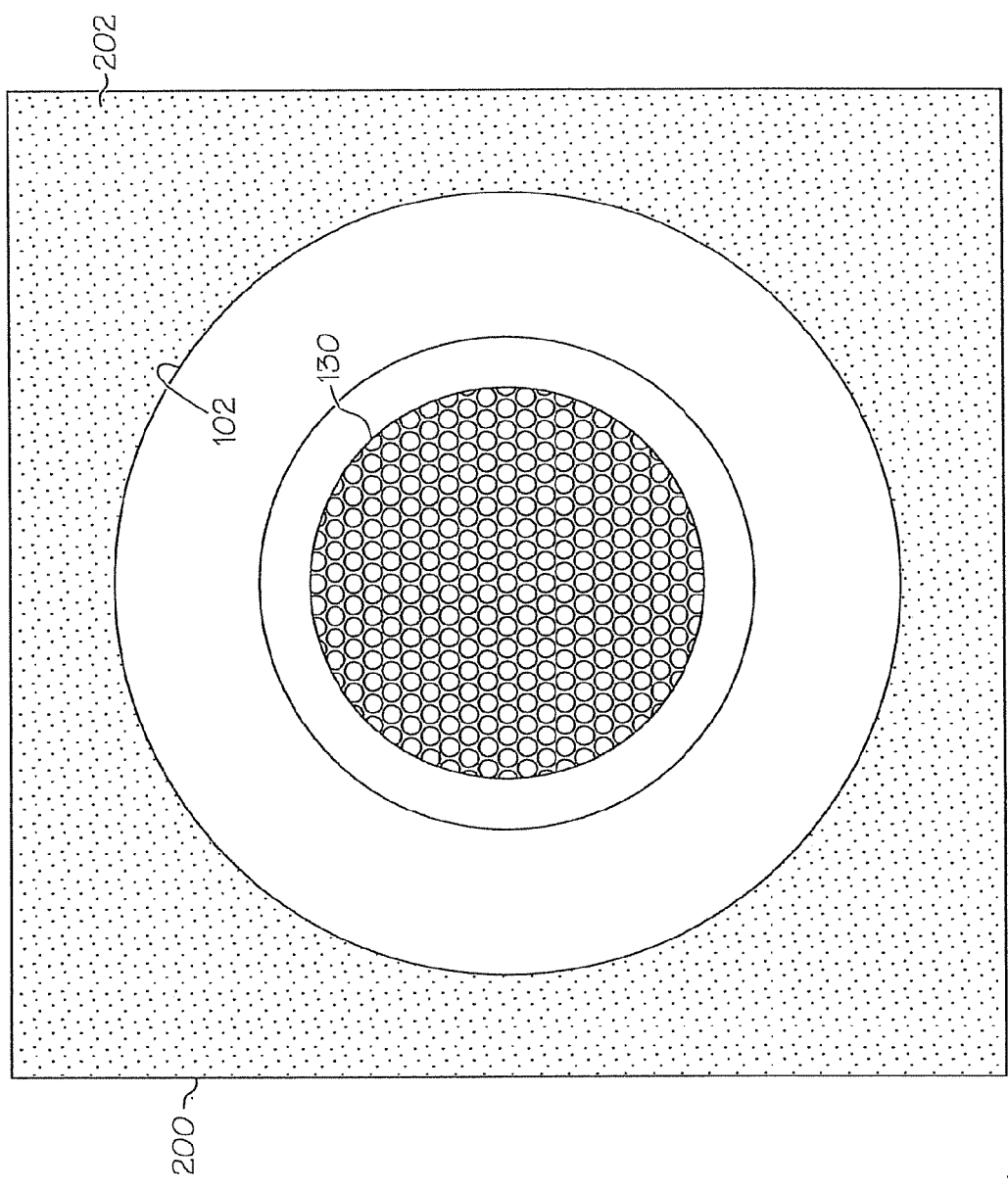
FIG. 11A depicts an initial cross sectional slice of a die sintered to a build platform.
Figure 11B:
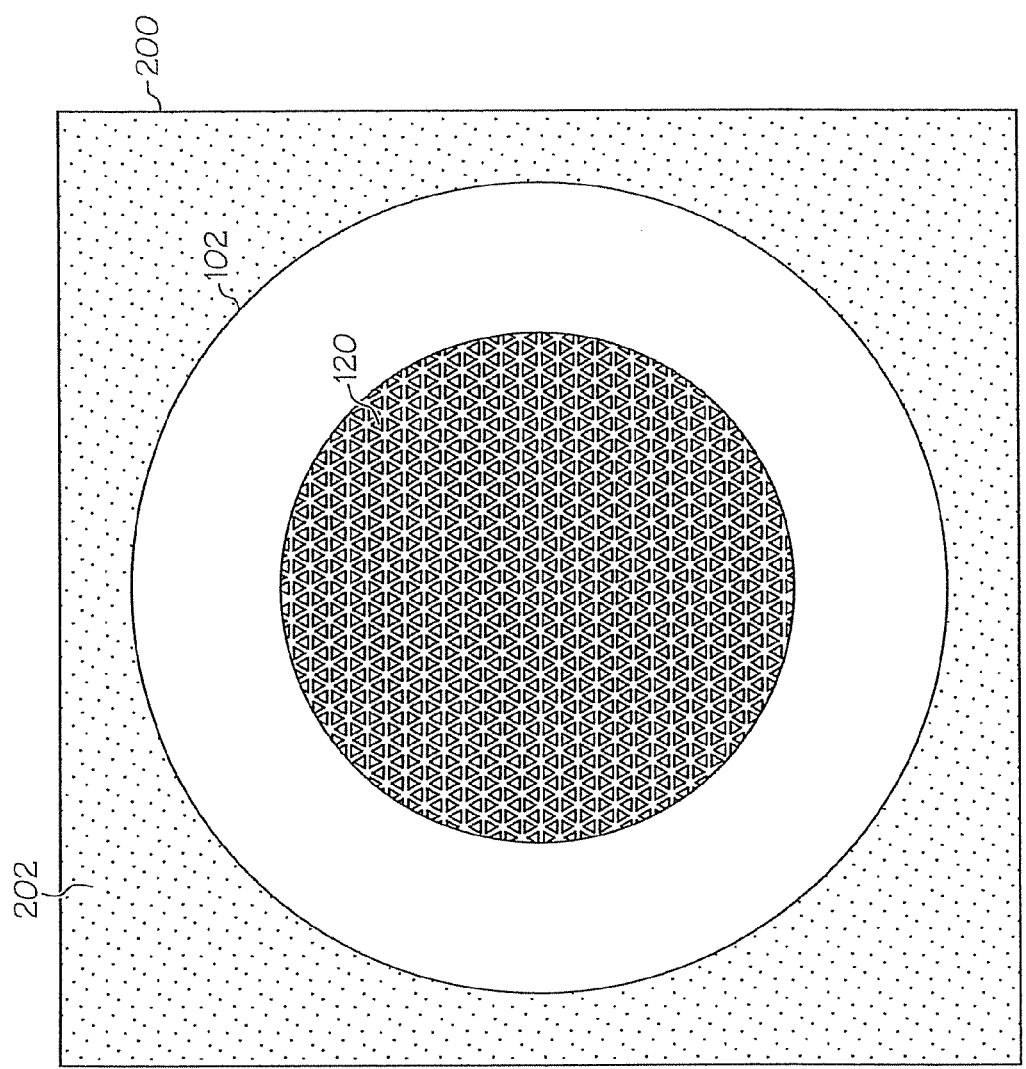
FIG. 11B depicts a cross sectional slice of the body feed section of a die.
Figure 11C:
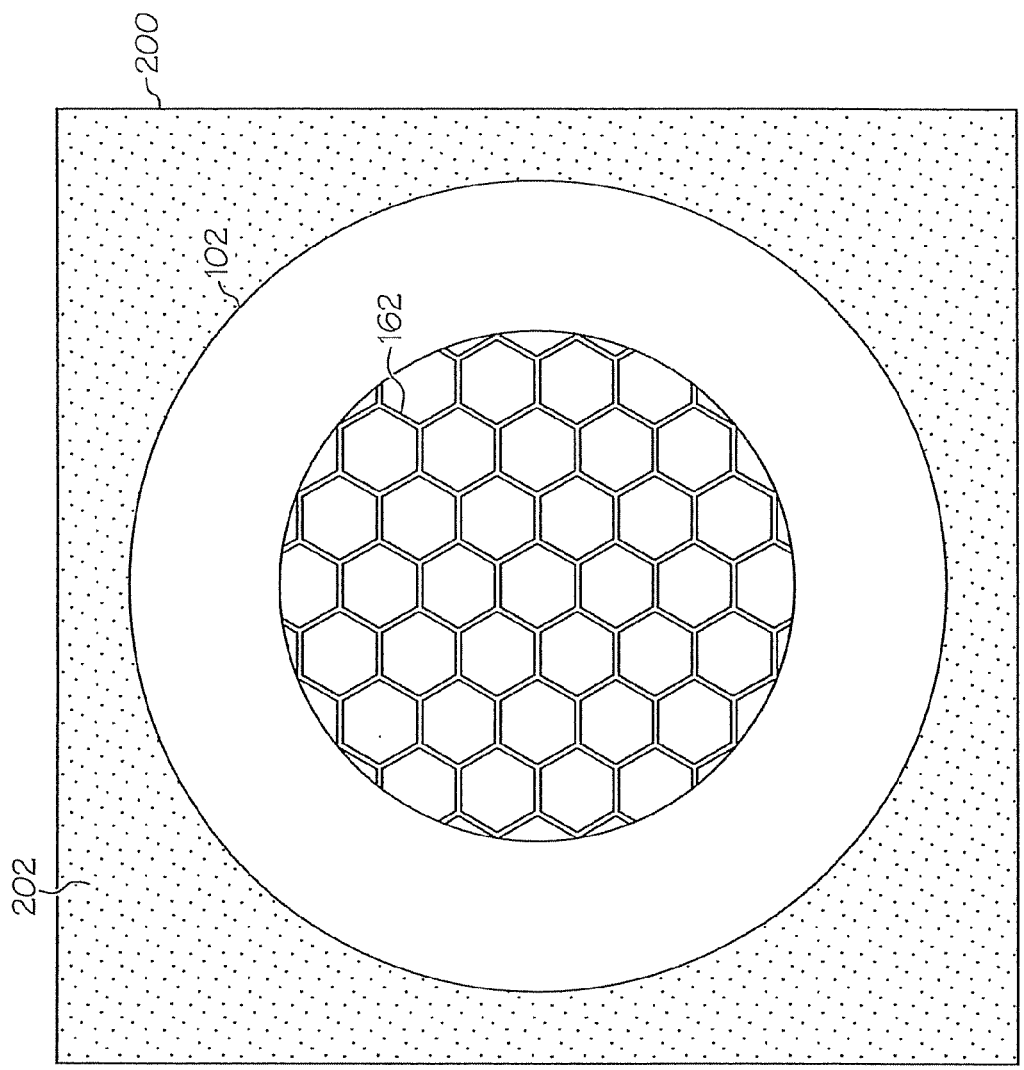
FIG. 11C depicts a cross sectional slice of the body feed section of a die according to one or more embodiments shown and described herein.

After the initial layer of sinterable material is deposited a radiation source, in this example a sintering laser, is traversed over the base material in a predetermined pattern thereby consolidating or sintering the initial layer of base material to the build platform. For example, referring to FIG. 11A, the initial cross sectional slice of the die 100 is formed by traversing the radiation source over the deposited layer of sinterable material in a pattern corresponding to the pins 130 and die body 102 thereby sintering the sinterable material to fabricate a cross sectional slice of the die corresponding to the die body 102 and pins 130 of the extrusion forming section 105. The material deposition and consolidation steps are repeated multiple times to build up each section of the die with each newly deposited cross sectional slice being deposited on and sintered to a previously sintered cross sectional slice. For example, to create the body feed section 104, the deposited layer of sinterable material is sintered in the pattern of the body feed ribs 120 and the die body 102, as shown in FIG. 11B. Similarly, to create the inlet feed section 160, the deposited layer of sinterable material is sintered in the pattern of the inlet feed ribs 162 and the die body 102.

While embodiments of the die 100 described herein may be monolithically formed utilizing a layer-by-layer deposition and consolidation process in which multiple discrete layers of a powdered base material are deposited and consolidated, it should be understood that other layer-by-layer deposition and consolidation techniques may be used to form the die. For example, in one embodiment, the die 100 may be constructed utilizing stereo lithography in which the base material is a liquid polymer resin which is deposited in discrete layers.

After deposition, each discrete layer may be consolidated or cured with a radiation source, such as a UV radiation source, before the next subsequent layer of liquid polymer resin is deposited. The UV radiation source may be passed over the layer of liquid polymer resin in a predetermined pattern such that the consolidated layer has the desired features of the die.

In another embodiment, the layer-by-layer deposition and consolidation process may include depositing discrete layers of a base material which includes a powdered metal or ceramic material containing a binder. After the base material is deposited, a radiation source, such as an ultraviolet or infrared radiation source, may be passed over the deposited layer in a predetermined pattern thereby curing the binder and consolidating the base material in the desired pattern. Accordingly, it will be understood that various deposition techniques may be used to monolithically form dies 100 described herein.

Reference will now be made to FIGS. 2-4 to describe the flow of extrudate material through the die 100 as the die 100 is used to form an extrusion similar to the extrusion 10 shown in FIG. 1, however, using the die 100 of FIGS. 2-4, the extrusion is formed without a core. To form the extrusion, which in this example is a microstructured optical fiber preform, an extrudate material is introduced into the die 100 at the inlet 110. In the present embodiment the extrudate may be a polymer melt or a glass melt. For example, when the extrudate material is a polymer melt, the melt may comprise a cyclo olefin copolymer, PMMA, polyacrylate, polycarbonate, polystyrene, polypropylene, polyester, polyethylene or similar polymer materials that may be used to produce polymer optical fibers. Alternatively, when the extrudate material is a glass melt, the glass melt may include borosilicate glasses, chalcogenide glasses, sulphides, phosphates or any other glass compositions which may be suitable for forming glass optical fibers. For purposes of the present example, the melt comprises a polymer material.

In one embodiment, the polymer melt may be fed into the inlet 110 of the die 100 through a feed pipe (not shown) fluidly coupled to the inlet 110. For example, in one embodiment the feed pipe may include a ram-type extruder which forces the extrudate material into the die 100 using mechanical or hydraulic pressure. However, it should be understood that other mechanisms for feeding the extrudate material through the feed pipe and die 100 may be used. For example, in one embodiment the feed pipe may comprise an extrusion screw, which, when rotated, causes the melt to flow into the extrudate flow path of the die 100 formed between the inlet 110 and the outlet 112.

When the die 100 comprises an inlet feed section 160, as shown in FIGS. 2-4, the extrudate material initially flows into the inlet feed channels 164. From the inlet feed channels 164, the extrudate material flows into the body feed section 104 where the extrudate material is further divided into the smaller body feed channels 124. The extrudate material exits the body feed channels 124 and enters either the thin-wall forming portion 106 or thick wall forming portion 107 of the extrusion forming section 105.

When the extrudate material exits the body feed section 104 and enters the thin-wall forming portion 106 of the extrusion forming section 105, the extrudate material flows in the interstitial area 182 between the pins 130. However, it will be understood that, as the extrudate material flows between and around the pins 130 of the thin-wall forming portion 106, the extrudate material re-knits or reconstitutes in a radial direction thereby forming a web of thin-walled struts and open cells as described above. Further, because the interstitial area 182 between the pins 130 are fluidly coupled to the thick-wall forming portion 107, the web of struts and open cells re-knit or reconstitute in a radial direction with the extrudate material flowing through the thick-wall forming portion 107. However, the pins 130 prevent the extrudate material from reconstituting in an axial direction such that, as the extrudate material exits the outlet 112 of the die, the extrudate material is imparted with a structure of open channels separated by a web of thin struts, similar to that depicted in FIG. 1.

The portion of the extrudate material that exits the body feed section 104 and enters the thick-wall forming portion 107 of the extrusion forming section 105 forms the thick-walled sleeve 16 of the extrusion 10. As the extrudate material flows through the thick-walled forming portion 107 a portion of the extrudate material re-knits in a radial direction with the extrudate material flowing through the thin-walled forming portion 106 as described above. The re-knitting of the extrudate material attaches the web of struts to the sleeve thereby attaching the microstructured region of the extrusion to the sleeve.

As the extrudate material flows through the thick-wall forming portion 107, the extrudate material also flows through the baffles 140 which impedes the flow of the extrudate material such that the flow rate of extrudate material through the thick-wall forming portion 107 is substantially equal to the flow of extrudate material through the thin-wall forming portion 106. Specifically, as the extrudate material flows through the baffles 140, the extrudate material experiences a pressure drop due to the impedence of the baffles which is substantially equal to the pressure drop experienced by the extrudate material flowing through the thin-wall forming portion 106. Because the pressure drop between the extrudate material flowing in the thick-wall forming portion 107 and the extrudate material flowing through the thin-walled forming portion 106 is substantially the same, the flow front of the extrudate material remains uniform across the radial cross section of the die 100 and, as a result, shearing forces in the extrudate material are substantially mitigated or reduced thereby eliminating abnormalities or defects in the resulting extrusion.

Further, the height H of the baffles 140 (and therefore the height of the baffle channels 142) permit the extrudate material to re-knit after passing through the baffle section 108 such that the baffles 140 and baffle channels 142 do not impart structure to the extrudate material and the sleeve of the resulting extrusion is substantially solid. However, the length L of the pins 130 are sufficiently long such that the extrudate material does not re-knit in an axial direction after exiting the microstructure forming portion 106, as described hereinabove.

After exiting the extrusion forming section 105, the extrudate material exits the outlet 112 of the die having a relatively thick-walled portion formed by the thick-walled forming portion 107 and a relatively thin-walled portion formed by the thin-walled forming portion 106 similar to the exemplary embodiment of the extrusion 10 shown in FIG. 1 which comprises a relatively thick-walled sleeve 16 enclosing the microstructured region 14 which comprises a plurality of relatively thin-walled struts 20.

While specific examples used herein describe embodiments of the die being used to form microstructured optical fiber preforms from glass or polymer melts, it should be understood that the dies may be used to form other types of extrusions from other types of extrudate materials. By way of example and not limitation, the dies described herein may be used with ceramic extrudate material to produce ceramic extrusions which may be used, for example, as filters.

It should now be understood that the baffled dies shown and described herein may be used to provide extrusions which comprise both relatively thick-walled portions and relatively thin-walled portions. Formation of such extrusions is facilitated by providing a die with thin-wall forming portions and baffled thick-wall forming portions such that the flow rate of material through the thick-wall forming portions is impeded which, in turn, creates a uniform flow rate of extrudate material through the die. Dies having this configuration have reduced shear forces in the extrudate material which substantially mitigates or eliminates defects in the resulting extrusion caused by non-uniform flow rates of extrudate material through the die.

Further, it should be understood that the dies described herein may be monolithically formed as a single piece using layer-by-layer deposition and consolidation processes. Monolithically forming the die provides a die which is stronger than a die assembled from discrete sections which are either mechanically attached or bonded together. Further, monolithically forming the die through a layer-by-layer deposition and consolidation process also permits the formation of baffles in the extrudate flow path which may not otherwise be achievable in a monolithic die utilizing traditional machining techniques.

It will be apparent to those skilled in the art that various modifications and variations can be made to the monolithic dies described herein without departing from the spirit and scope of the invention. Thus it is intended that the present invention cover the modifications and variations of this invention provided they come within the scope of the appended claims and their equivalents.

What is claimed is:

1. A die for forming an extrusion, the die comprising a die body, a body feed section and an extrusion forming section, wherein:
    the die body comprises an inlet and an outlet defining an extrudate flow path through the die body;
    the body feed section is positioned between the inlet and outlet and comprises an arrangement of body feed channels disposed in the extrudate flow path;
    the extrusion forming section is positioned between the body feed section and the outlet and comprises a thin-wall forming portion fluidly coupled to at least one thick-wall forming portion comprising a first thick-wall forming portion, wherein the thin-wall forming portion comprises an array of pins extending from the body feed section towards the outlet and the first thick-wall forming portion comprising a forming area defined between the body feed section and the outlet of the die body, the forming area further extends around the thinwall forming portion between the array of pins and an interior sidewall of the die body, wherein the first thick-wall forming portion further comprises at least one baffle section disposed in the extrudate flow path within the forming area of the first thick-wall forming portion, the forming area of the first thick-wall forming portion having a radial cross sectional area greater than an interstitial area between mutually adjacent pins.

2. The die of claim 1 wherein the at least one thick-wall forming portion further includes a second thick-wall forming portion and the thin-wall forming portion is disposed between the first thick-wall forming portion and the second thick-wall forming portion.

3. The die of claim 1 wherein the at least one baffle section comprises a plurality of baffles arranged to form a plurality of baffle channels.

4. The die of claim 3 wherein an area defined by each baffle channel of the plurality of baffle channels is substantially equal to a pin interstitial area between mutually adjacent pins of the thin-wall forming portion.

5. The die of claim 1 wherein a ratio of a length of the pins to a height of the baffles is less than about 1000.

6. The die of claim 1 wherein the body feed section and the extrusion forming section are monolithically formed with the die body.

7. The die of claim 3 wherein the area defined by each baffle channel of the plurality of baffle channels is less than an area defined by each body feed channel.

8. The die of claim 1 wherein the die further comprises an inlet feed section comprising a plurality of inlet feed channels positioned between the inlet and the body feed section.

9. The die of claim 8 wherein the inlet feed section, body feed section and extrusion forming section are monolithically formed with the die body.

10. The die of claim 1, wherein the interior sidewall of the die body defines an outer periphery of an extrusion footprint of the die body.

11. The die body of claim 1, wherein at least a portion of the baffle section is spaced away from the body feed section.

12. The die body of claim 1, wherein the baffle section extends in an extension direction from the thin-wall forming portion to the interior sidewall of the die body.

13. The die body of claim 12, wherein the baffle section includes a height extending transverse to the extension direction of the baffle section, wherein the height is from about 0.02 mm to about 10 mm.

14. The die body of claim 13, wherein the height is from about 0.1 mm to about 1 mm.

15. The die body of claim 13, wherein an acute angle is formed between the extension direction and the thin-wall forming portion.

16. A die for forming an extrusion, the die comprising a die body, a body feed section and an extrusion forming section, wherein:
    the die body comprises an inlet and an outlet defining an extrudate flow path through the die body and circumscribed by an interior sidewall of the die body, wherein the interior sidewall of the die body defines an outer periphery of an extrusion footprint of the die body;
    the body feed section is positioned between the inlet and outlet and comprises an arrangement of body feed channels disposed in the extrudate flow path;
    the extrusion forming section is positioned between the body feed section and the outlet and comprises a thin-wall forming portion fluidly coupled to at least one thick-wall forming portion comprising a first thick-wall forming portion, wherein the thin-wall forming portion comprises an array of pins extending from the body feed section towards the outlet and the first thick-wall forming portion comprising a forming area defined between the body feed section and the outlet of the die body, the forming area further extends around the thinwall forming portion between the array of pins and the interior sidewall of the die body, wherein the first thick-wall forming portion further comprises at least one baffle section disposed in the extrudate flow path within the forming area of the first thick-wall forming portion, wherein at least a portion of the baffle section is spaced away from the body feed section, and wherein the forming area of the first thick-wall forming portion has a radial cross sectional area greater than an interstitial area between mutually adjacent pins.

17. The die of claim 16, wherein the body feed section is monolithically formed with the array of pins.

18. A die for forming an extrusion, the die comprising a die body, a body feed section and an extrusion forming section, wherein:
 the die body comprises an inlet and an outlet defining an extrudate flow path through the die body, the die body further including an interior sidewall defining an outer periphery of an extrusion footprint of the die body;
 the body feed section is positioned between the inlet and outlet and comprises an arrangement of body feed channels disposed in the extrudate flow path;
 the extrusion forming section is positioned between the body feed section and the outlet and comprises a thin-wall forming portion fluidly coupled to at least one thick-wall forming portion, wherein the thin-wall forming portion comprises an array of pins extending from the body feed section towards the outlet and the thick-wall forming portion further comprises at least one baffle section spaced from the body feed section and disposed in the extrudate flow path within the extrusion footprint, the thick-wall forming portion having a radial cross sectional area greater than an interstitial area between mutually adjacent pins.

19. The die of claim 18, the body feed section is monolithically formed with the array of pins.

\* \* \* \* \*